Sept. 14, 1965 J. A. COOMBS ETAL 3,206,528
PELLETIZING PROCESS AND APPARATUS
Filed July 2, 1962

JACK A. COOMBS
CHARLES F. MOONEY
INVENTORS

BY
ATTORNEYS

United States Patent Office 3,206,528
Patented Sept. 14, 1965

3,206,528
PELLETIZING PROCESS AND APPARATUS
Jack A. Coombs, Rochester, and Charles F. Mooney, Irondequoit, N.Y., assignors to Bausch & Lomb Incorporated, Rochester, N.Y., a corporation of New York
Filed July 2, 1962, Ser. No. 206,789
5 Claims. (Cl. 264—117)

This invention relates to means for providing homogeneity in the formation of pellets from a mixture of material.

In the process of mixing various constituents having different specific gravities, it is desirable to maintain an evenness of proportions of each of the constituents throughout the mixture. This is particularly true in the formation of pellets which subsequently are to be used in the process of glass making. The fluxes and glass forming oxides which combine to form a glass, must be evenly distributed throughout the raw batch. By the formation of pellets of an even mixture of the constituents and by hardening of the pellets in such a manner that they do not reproportion themselves, a supply of raw batch may be stored or directly fed to a glass furnace according to the needs. Accordingly this invention is intended to provide a means for evenly mixing and forming pellets of the raw batch used in formation of glass.

It is an object of this invention to provide a method of formation of pellets containing an even distribution of various constituents which have different specific gravities.

It is another object of this invention to evenly proportion the constituents of a raw batch in pellet form for use in the production of glass.

It is a further object of this invention to provide an apparatus for the formation of pellets of evenly distributed raw batch constituents for making glass.

The objects of this invention are accomplished by a pelletizing process of the constituents of the raw batch through the combined forces of a mechanical agitating and mixing, and the chemical action created by heating and releasing of moisture to partially dissolve portions of the mixture to form a cementing substance for coating of the granular particles of the mixture. The mechanical action produces a combination of centrifugal force and gravitational force simultaneously operating on the particles forming the constitutents of the mixture. The water contained in the hydrate constituents or salt having an affinity for water which is released upon heating may not be sufficient to produce a cementing action and accordingly water may be added directly to the mixture during pelletization. A stirring action through the use of mechanical means evenly distributes the water with the mixture and the centrifugal and gravitational force causes a snowballing of the granular constituents to build up in size to a point where the larger pellets automatically roll out of the pelletizing container.

The specific invention as well as other objects and advantages will become apparent to those skilled in the art in which a detailed description taken in conjunction with the drawings illustrate the preferred embodiment of this invention. This embodiment is intended to be illustrative only and not limiting in the scope of the invention.

The device as illustrated provides a mechanical arrangement for pelletizing the constituents of a composition having various specific gravities. The device through mechanical means cements various constituents together as the forces created cause a movement of the constituents creating a snowballing action and a building up of the pellets to a desired size.

The device is adapted for use with a feeding arrangement which is coordinated with the rate of discharge of pellets on the outgoing side of the device. Any suitable conveyor means might be used to carry away the pellets upon forming and discharging from the device.

Figure 1:
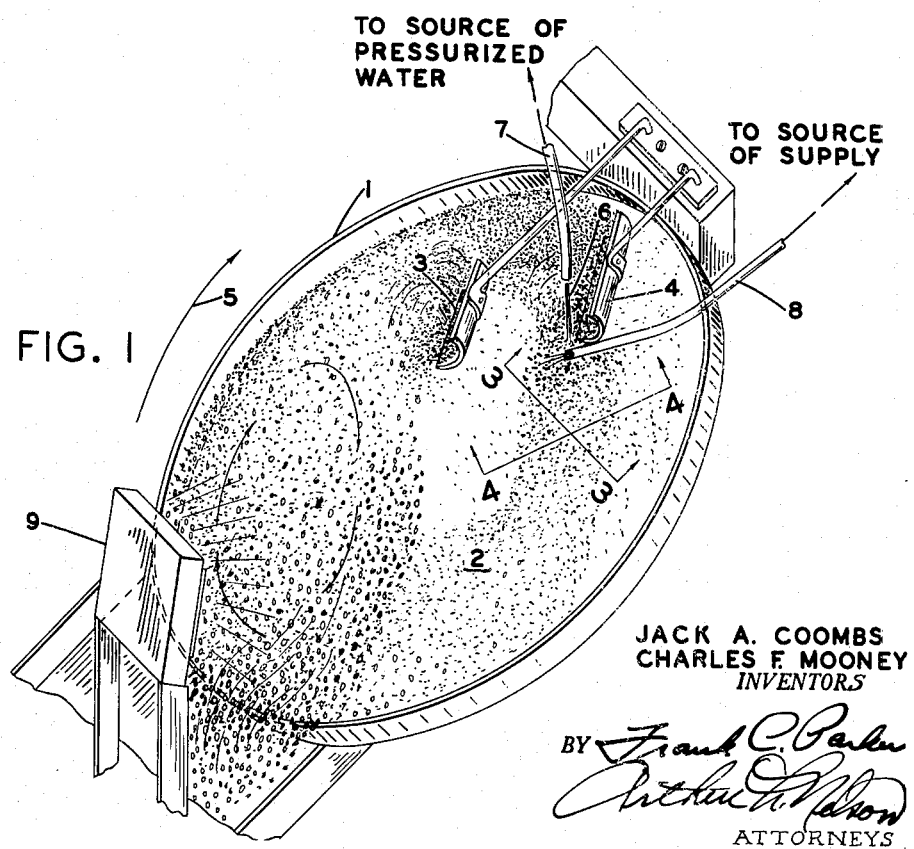
FIG. 1 is a three dimensional view of the pelletizing device.

Referring to the drawings FIG. 1 illustrates a view of the rotating pan 1 rotating about a central axis and containing the constituents which may have varying specific gravities. The pan 1 is rotated about its axis by a means illustrated in FIG. 2 which will subsequently be discussed. Positioned in the pan are two plows 3 and 4. The plow 3 is positioned ahead of the plow 4 relative to engagement of the mixture in terms of a rotational movement as indicated by the arrow 5. The plow 3 rolls the material radially outward into the path of the plow 4. The continued rotation of the pan 1 causes the material to engage the plow 4 causing a return rolling effect of the material throwing the material radially inward. Simultaneously with the rolling action the material is loosened causing air to be momentarily entrained in the mixture. This condition is ideal for injection of moisture through the stream 6 from the nozzle 7. The stream is under high pressure and deeply penetrates the loosened mixture passing by the plow 4. The moving condition of the material as it rolls over evenly distributes the moisture through the mixture. A further movement of the pan as it rotates brings the material adjacent to the material supply conduit 8 which distributes added material in such a manner that it is mixed underneath and with the material passing by the stream 6. The moistened material passing the stream is then mixed with the new material from the conduit 8 to evenly distribute moisture throughout the mixture.

Figure 3:
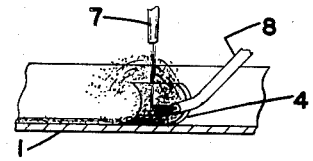
FIG. 3 illustrates a cross section as viewed from line 3—3 of FIG. 1.

FIG. 3 is a cross section view as viewed from line 3—3 illustrating the water stream penetrating into the loosened mixture as it passes the plow 4.

Figure 4:
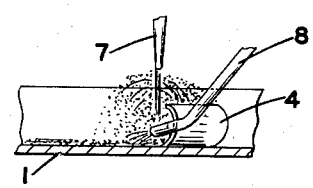
FIG. 4 illustrates a cross section view as viewed from line 4—4 of FIG. 1.

A section view as viewed from FIG. 4 is line 4—4 of FIG. 1 which further illustrates the mixing of the fresh supply of the raw batch with the moistened material in the pan. The rotation of the pan carries a portion of the mixture 2 in front of the heating element 9.

The heating element as illustrated comprises a gas heater connected to a suitable supply of gas which causes the flame to impinge upon a stainless steel screen. The screen becomes heated to the point where it glows emitting infrared radiation directed on the pellet forming area in the rotating pan. The intense heat of the infrared radiation penetrates the mixture releasing moisture and dissolving portions of the raw batch forming a cementing composition which coats on the particles in the raw batch. The particles continue to roll in a somewhat circular motion created by the centrifugal force of the rotating pan and gravitational force acting on each of the particles.

Figure 2:
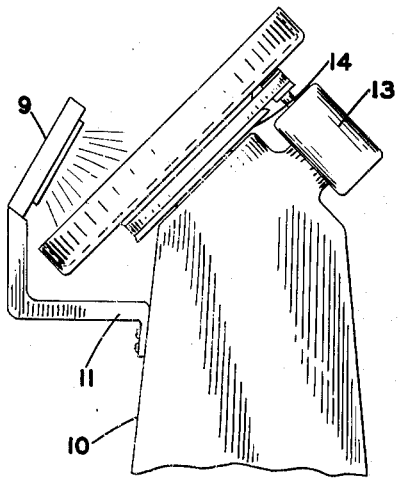
FIG. 2 is a side elevational view of the supporting mechanism for supporting the device.

Referring to FIG. 2 the heating element 9 is shown positioned radiating heat on the lower left hand portion of the pan as it rotates. The support 10 supports the heating element by the bracket 11. The motor 13 operates through a gear means 14 to rotate the pan 1.

The size of the pan does not materially affect the motion created in the mixture but basically increases the capacity of the device. A factor determining the size of pellets formed is the angle in which the pan is inclined to a horizontal plane. The greater the angle of the pan from a horizontal plane the smaller the pellets that are formed. The pellets formed are smaller due to the fact that components of gravitational force is greater on each pellet which tends to roll the pellet out of the pan.

An additional factor determining the pellet size is the speed of rotation of the pan. The greater the speed of rotation the greater the centrifugal force acting on each of the pellets and consequently a smaller size pellet will be caused to roll out of the pan than if a slower speed were present.

Increasing the water rate of feed and decreasing the material rate of feed have a tendency to increase the pellet size.

The pelletizing apparatus performs the following process in the formation of pellets. The raw batch containing the constituents necessary for the formation of a glass is placed in a pan. The material is then mixed by mechanical means as the pan rotates. The plows 3 and 4 cause a mixing and rolling action of the material throwing it in both directions and thoroughly mixing the constituents. If the batch is of such a nature that moisture need be added it is added as the material is rolled over at the instant considerable air is entrained in the mixture. A high pressure stream of water is directed into the loose fluffy mass of material to evenly distribute moisture throughout the mixture. Additional material is continuously added subsequent to the addition of moisture to cause the moist portion to mix with the dryer portions being added. If the constituents of the glass composition include hydrates containing sufficient water, the water need not be added as described above.

The pellet forming area is in a separate portion of the pan. The centrifugal and gravitational forces are created by the rotational movement of the pan and the material within the pan. The component of gravitational force causing movement of the pellet is accomplished by tilting the pan to a position inclined to a horizontal plane whereby, as the pellet is lifted to a higher position by the rotation of the pan the gravitational force tends to overcome the centrifugal force causing the pellet to roll downwardly. This occurs when a pellet has developed sufficient size that it will roll on the surface of the mixture. The pellet rolls downwardly to the edge of the pan and is withheld and again returns to a higher point as the pan rotates. The rolling action of each of the pellets is a continuous process until the pellets gain sufficient size that the gravitational component of force and the centrifugal force at the lower portion of the pan will cause the pellet to roll out of the pan.

Simultaneously with the rolling action of each of the pellets is a heating step which continuously adds heat to the mixture. The heat is caused by a gas flame impinging on a stainless steel screen radiating energy. The radiant energy is directed on the pellet forming area to provide a release of moisture from the constituents of the raw batch. Moisture at a high temperature is present in this area which causes a partial dissolving and cementing of the constituents to each other and a snowballing effect which gradually increases the size of each of the pellets as the continue to roll, however, it is not believed that solubility is necessary in the pelletizing process. The cementing and growing action of each of the pellets is simultaneous with a hardening process of the pellets and evaporation of moisture as they are directly under the source of radiation and are being heated continuously. As the pellet grows, its movement is confined to an area in the pan immediately in front of the radiation source. The continued radiation completes the process of pelletizing to form a hard dry pellet suitable for storage of feeders into a glass furnace. When the pellet has gained sufficient size it completely rolls out of the pan in its downward movement. The pellets are baked to a hardened formation and each pellet will remain separated from adjacent pellets even when stored for a considerable time. The process is continual as raw material is being added continuously. The rate of feeding of material is equal to the rate of discharge of pellets on the opposite side. The process is compete as the pellet leaves the pan.

The device as illustrated provides an operation whereby the pellets may be formed of any size which may be desired. The pellets formed are hardened in the process as they grow. The mixture of the material is simultaneous and evenly proportioned to cause a well distributed formation of each of the constituents in the pellet.

It is to be understood that numerous modifications and variations in the apparatus might be devised without departing from the spirit of the invention. The following claims define the limits of the invention.

We claim:

1. A pelletizing process for making pellets of raw batch constituents of a glass forming mixture comprising the steps, placing a mixture of the raw batch constituents for making glass in a mixing means, adding moisture to the mixture to aid in partially dissolving and cementing of the mixture during pellet forming, continuously mixing the constituents and evenly distributing each of the constituents relative to each other, causing a circular rolling action of particles to form pellets of gradually increasing size on a portion of the surface of the mixture, directing radiant energy on the portion of the surface of the mixture for simultaneously heating and further assisting in dissolving portions of the constituents to provide a cementing action during the pellet forming, drying and hardening the pellets while the pellets gradually increase in size and are eventually discharging from the container due to rotational and gravitational force on the pellets.

2. A pelletizing process for pelletizing raw batch glass forming constituents comprising the steps, continuously adding the constituents of a glass forming material in a container means, continuously mixing and evenly distributing the constituents in the container means, directing an intense radiation on a portion of the surface of the constituents to produce a sufficiently high temperature to release moisture from anhydrous constituents for partial dissolving and cementing of all the constituents into hardened pellets, simultaneously applying centrifugal and gravitational forces to the constituents of the mixture thereby creating a rolling action of the particles causing said particles to grow into pellets of continuously increasing size until the pellets are discharged from the container means due to the centrifugal and gravitational forces acting thereon.

3. A pelletizing apparatus for making pellets of raw batch glass forming constituents comprising, a rotating container means receiving a mixture of raw batch constituents for glass making and rotating about an axis inclined relative to a vertical line, mixing means extending into said container for stirring and evenly distributing all constituents of the mixture, rotating means rotating said container means and causing a circulating rolling action of particles of constituents to form pellets on a portion of the surface of the mixture, a source of radiation for directing radiant energy on the portion of the surface of the mixture causing partial dissolving, heating, drying, and hardening of the pellets formed on the surface of the mixture, said rotating means rotating said container in an inclined position thereby causing a gradual increase in pellet size and eventually discharge from the container due to centrifugal and gravitational forces operating on the pellets.

4. A pelletizing apparatus for making pellets of raw batch glass forming constituents comprising a rotating container means rotating about an axis inclined to a horizontal plane and creating gravitational forces on the constituents received therein, rotating means rotating said container means and creating centrifugal forces on the constituents, plowing members extending into an opening on said container means for evenly distributing and thoroughly mixing the constituents of the mixture upon rotation of said container means, moistening means adapted for adding water to the constituents simultaneously with mixing, a source of radiation adapted for directing intense radiant energy on the surface of the mixture causing a partial dissolving, cementing, drying, and hardening simultaneously with forming of the pellets, the rotating means connected to said container creating centrifugal forces in said container acting together with gravitational forces causing formation of pellets by the rolling action of particles of the constituents of the mixture on the surface of the mixture, whereby the pellets grow in size and form hardened pellets of a predetermined size and said forces then cause the discharge of the pellets from the container means.

5. A pelletizing apparatus for making pellets of raw batch glass forming constituents comprising a rotating container inclined to a horizontal position creating gravitational forces on the constituents of a glass forming mixture, mixing means extending into said container mixing and evenly distributing the constituents of the mixture, means rotating said container creating centrifugal forces which combined with gravitational forces cause a rolling action of particles on a portion of the surface of the mixture causing a growing of particles into pellets, a source of infrared radiation adapted for directing intense infrared radiation on the pellet forming portion of the surface of the mixture causing a release of water from any hydrate constituents and partially dissolving and cementing all constituents during the formation of pellets, said heating and rolling action causing the particles to grow to a sufficient size of pellets to be discharged from the container due to rotational and gravitational forces on the particles.

References Cited by the Examiner

UNITED STATES PATENTS

| | | | |
|---|---|---|---|
| 312,041 | 2/85 | Upjohn | 18—1 |
| 2,876,491 | 3/59 | Meyer | 18—1 |
| 2,948,534 | 8/60 | Huszar | 18—1 |
| 3,030,657 | 4/62 | Von Reppert | 18—1 |
| 3,050,772 | 8/62 | Von Reppert | 18—1 |
| 3,060,496 | 10/62 | McDowell et al. | 18—1 |

ALEXANDER H. BRODMERKEL, *Primary Examiner.*

UNITED STATES PATENT OFFICE
CERTIFICATE OF CORRECTION

Patent No. 3,206,528                                  September 14, 1965

Jack A. Coombs et al.

It is hereby certified that error appears in the above numbered patent requiring correction and that the said Letters Patent should read as corrected below.

Column 3, line 49, after "radiating" insert -- radiant --; line 74, for "compete" read -- complete --; column 5, line 20, strike out "of infrared radiation adapted for directing intense in-".

Signed and sealed this 19th day of April 1966.

(SEAL)
Attest:

ERNEST W. SWIDER                                  EDWARD J. BRENNER
Attesting Officer                                       Commissioner of Patents